United States Patent [19]

Sasuta

[11] Patent Number: 5,235,598
[45] Date of Patent: Aug. 10, 1993

[54] METHOD FOR UTILIZING A CONTROL CHANNEL FOR BOTH DATA AND VOICE

[75] Inventor: Michael D. Sasuta, Mundelein, Ill.

[73] Assignee: Motorola, Inc., Schaumburg, Ill.

[21] Appl. No.: 828,326

[22] Filed: Jan. 30, 1992

[51] Int. Cl.$^5$ .......................... H04J 3/12; H04Q 7/00; H04Q 9/00
[52] U.S. Cl. ........................... 370/110.1; 340/825.03; 455/34.1; 370/95.1
[58] Field of Search .................. 370/94.1, 60, 110.1; 379/58, 59; 340/825.03, 825.04; 455/33.1, 33.2, 34.1, 34.2, 34.3, 34.4

[56] References Cited

U.S. PATENT DOCUMENTS

| | | | |
|---|---|---|---|
| 4,723,264 | 2/1988 | Sasuta et al. | 379/59 |
| 4,757,496 | 7/1988 | Bartholet et al. | 370/95.1 |
| 4,831,373 | 5/1989 | Hess | 340/825.03 |
| 4,870,408 | 9/1989 | Zdunek et al. | 340/825.03 |
| 4,912,756 | 3/1990 | Hop | 379/59 |
| 4,942,570 | 7/1990 | Kotzin et al. | 370/110.1 |
| 4,977,589 | 12/1990 | Johnson et al. | 379/58 |
| 5,115,233 | 5/1992 | Zdunek et al. | 340/825.5 |

Primary Examiner—Douglas W. Olms
Assistant Examiner—Ajit Patel
Attorney, Agent, or Firm—Timothy W. Markison; Steven G. Parmelee

[57] ABSTRACT

In a trunking communication system that is equipped to utilize the control channel as both a voice and control channel, a communication unit can transmit control data to the communication resource allocator in the following manner. Once a voice channel is selected as a voice/control channel, a communication resource allocator transmits the selection to the plurality of communication units. Thus, when the control channel is functioning as a voice channel, the communication unit can transmit a control request to the communication resource allocator via the voice/control channel.

3 Claims, 2 Drawing Sheets

METHOD FOR UTILIZING A CONTROL CHANNEL FOR BOTH DATA AND VOICE

FIELD OF THE INVENTION

This invention relates generally to trunked communication systems and in particular to a method that allows a communication unit to utilize a control channel for both data transmissions and voice transmissions.

BACKGROUND OF THE INVENTION

Trunking communication systems are known to comprise a plurality of communication units arranged into a predetermined number of talk groups, a limited number of communication resources that are transceived via a predetermined number of repeaters, and a communication resource allocator that allocates the limited number of communication resources among the plurality of communication units. A communication resource may be a TDM bus, a frequency carrier, a pair of frequency carriers, or any other RF transmission means. Of the communication resources, one is typically selected as a control channel while the remaining communication resources act as voice channels. The control channel transceives outbound signalling words (OSW) from the communication resource allocator to the communication units and also inbound signalling words (ISW) from the communication units to the communication resource allocator. OSWs and ISWs are data which indicate system operations to be performed or system features that are desired to be accessed by the communication units. For example, when a communication unit desires to transmit a message to another communication unit, it transmits an ISW to the communication resource allocator requesting access to a communication resource and identifies the target communication unit. If the communication resource allocator grants the communication units request, it transmits and OSW to the communication unit indicating to both the initiating communication unit and the target communication unit which communication resource the conversation will take place on.

At times, the communication resource allocator will not grant the communication units request for a communication resource primarily due to an overloading of the system, i.e. all the communication resources are allocated and there are several requests waiting to be granted. Under such conditions, the communication resource allocator, which typically includes a queue to stored the requests that can't be granted upon receipt, is saturated and can not handle, for that moment, another request for a communication resource. To handle this overload condition, a prior art system may temporarily use the control channel as a voice channel, thus increasing the number of voice channels which reduces the communication resource request backlog. When the control channel is acting as a voice channel, the communication resource allocator cannot receive ISWs or transmit OSWs which leaves communication units that are not presently in a communication or in the communication resource requesting queue temporarily incapable of communicating with the communication resource allocator. This presents a serious problem when a communication unit needs to immediately communicate with the communication resources allocator for, as an example, when the unit has an emergency condition.

Therefore, a need exits for a method that will allow a communication unit to utilize a communication resources both as a control channel and a voice channel.

SUMMARY OF THE INVENTION

This need and others are substantially met by the method for utilizing a control channel for both data and voice as disclosed herein. In a trunked communication system that comprises a plurality of communication units, a limited number of communication resources that are transceived via a predetermined number of repeaters, and a communication resource allocator that allocates the limited number of communication resources among the plurality of communication units, wherein one of the communication resources functions as a control channel and the remaining communication resources function as voice channels, and wherein, from time to time, the control channel is used as a voice channel, a method for transmitting control channel information on the control channel when it is functioning as a voice channel is as follows. Having selected at least one of the voice channels to receive voice data and at least a limited set of control data to produce a voice/control channel, the communication resource allocator transmits the selected voice/control channel to the plurality of communication units. When the control channel is functioning as a voice channel, a communication unit transmits a control request of the at least a limited set of control data to the communication resource allocator via the voice/control channel.

DESCRIPTION OF A PREFERRED EMBODIMENT

Figure 1:
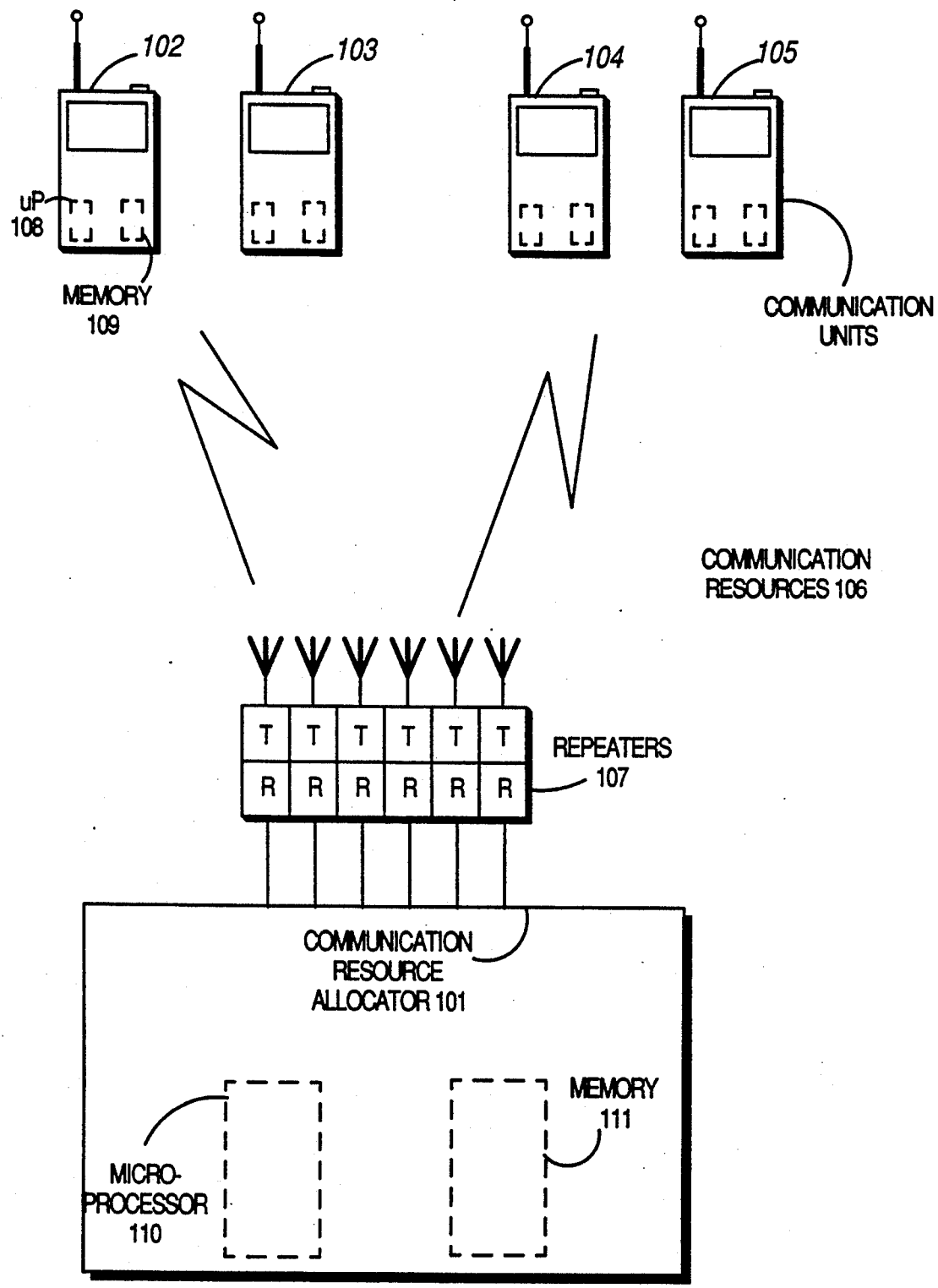
FIG. 1 illustrates a trunked communication system that may incorporate the present invention.

FIG. 1 illustrates a trunking communication system comprising a communication resource allocator 101, a plurality of communication units (four shown) 102-105, a limited number of communication resources 106, and a limited number of repeaters 107. Each of the communication units 102-105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102-105 and the communication resource allocator 101 via the repeaters 107, wherein the repeaters may comprise base stations. One of the communication resources 106 is selected as the control channel which transceives trunking communication system control data between the communication resource allocator and the communication units 102-105.

The trunking communication system of FIG. 1 supports communications between communication units by allocating communication resources to requesting communication units. Due to the limited number of communication resources, typically 12 per communication system, there may be more requests for allocation of communication resources than can be processed, i.e. the system becomes very busy. Under such conditions, the control channel may be temporarily used as a voice channel. The temporary use of the control channel as a voice channel is known, as is when the transitions (when the control channel functions as a voice channel and when it converts back to a control channel) are made. Because this technology is known, no further discussion will be presented.

Figure 2:
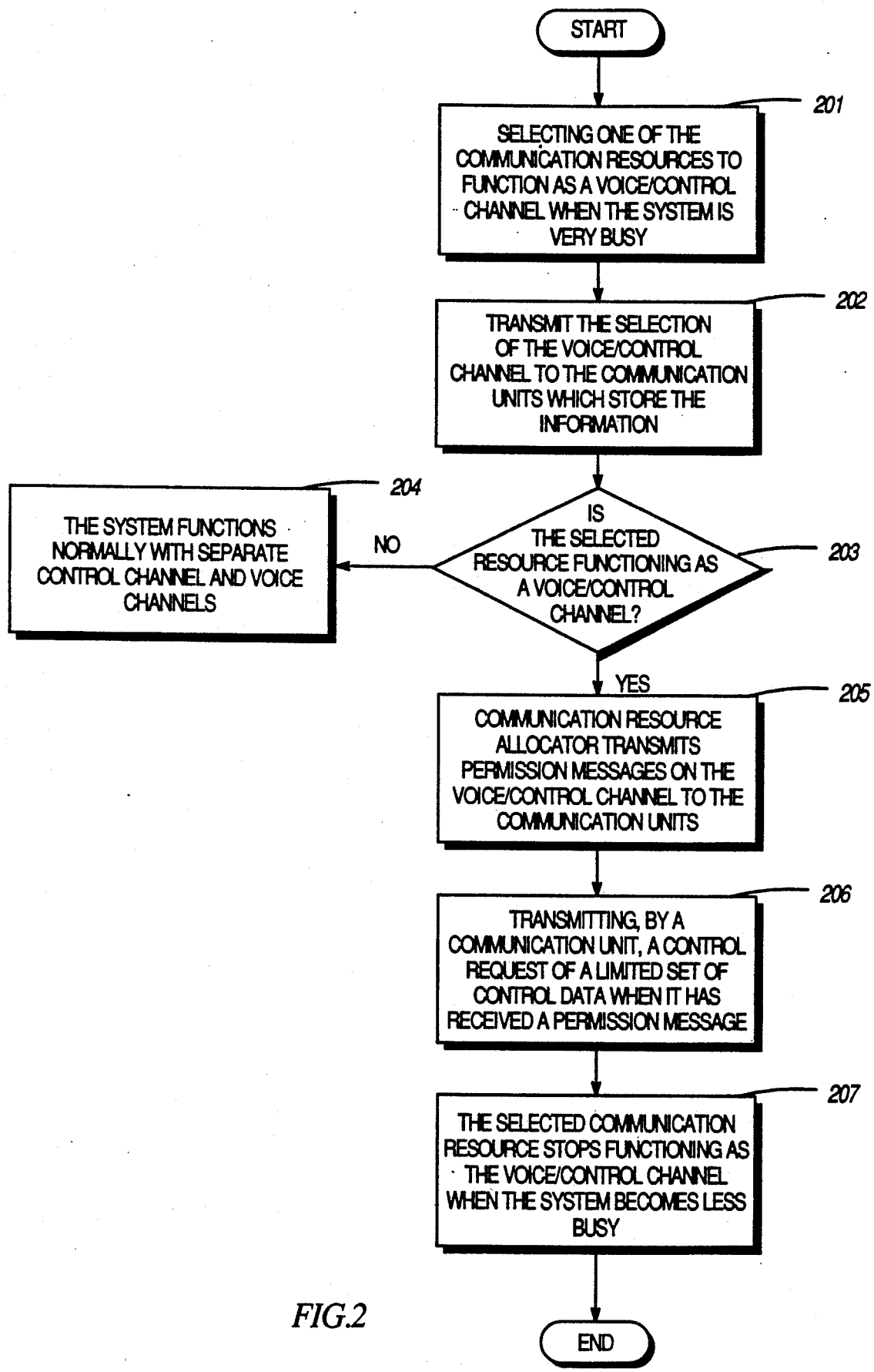
FIG. 2 illustrates a logic diagram of an implementation of the present invention.

The method of FIG. 2 can be employed in a system that temporarily utilizes the control channel as a voice channel to allow all the communication units to communicate with the communication resource allocator when the control channel is functioning as a voice channel. The respective portions of the algorithm are programmed into a microprocessor of the communication resource allocator and the communication units. In addition, the communication resource allocator and the communication units are programmed to transceive low speed signalling which is known. At step 201, the communication resource allocator selects one of the communication resources to function as a voice/control channel when the system becomes very busy. The selection of the voice/control channel is typically based on which communication resource is supporting the lowest priority communication and which communication resource can support both voice and control data. Prioritization of communications is known, thus no further discussion will be presented. The communication resource allocator determines if a communication resource can accommodate both voice and control data by transmitting low speed signalling. The low speed signalling, which is known, is interspersed with the normal communication on the communication resource such that on-going communications are not disrupted. Having selected a voice/control channel in this manner, the communication resource allocator transmits, via low speed signalling, the selection on the communication resource that was functioning as the control channel and the voice channels to the communication units 202.

The process continues at step 203 where it is determined whether the selected communication resource is functioning as a voice/control channel. If the selected resource is not functioning as a voice/control channel, the system functions normally with a separate control channel and voice channels 204. If, however, the selected resource is functioning as a voice/control channel 203, the communication resource allocator transmits permission messages, via low speed signalling, on the voice/control channel to the communication units 205. The permission messages indicate when a communication unit can transmit its control request on the voice/control channel.

When a communication unit, which is programmed to transceive low speed signalling, receives a permission message, it may transmit a control request from a limited set of control data to the communication resource allocator 206. The limited set of control data comprises control requests having a high priority for that system. For example, the limit set may include emergency conditions, requests by priority communication units, or other system services that are essential to system operations. Each of the communication units may contain in memory which system services are part of the limited set, or only the communication resource allocator would have that information and would either not respond to requests not from the limited set or it would send a rejection message.

Once the communication resource allocator determines that the communication system no longer needs the voice/control channel, it separates the control channel from the voice channels and transmits a message, via the voice channels, indication which communication resource is the control channel to the communication units 207. As mentioned above, when the voice/control channel becomes functional and when the control channel and voice channels are separate, is known in the art. Having separated the voice and controls channels, the process ends for this particular busy period.

I claim:

1. In a trunking communication system that comprises a plurality of communication units, a limited number of communication resources that are transceived via a predetermined number of repeaters, and a communication resource allocator that allocates the limited number of communication resources among the plurality of communication units, wherein one of the communication resources functions as a control channel and the remaining communication resources function as voice channels, and wherein, from time to time, the control channel is used as a voice channel, a method for the trunking communication system to allow a communication unit of the plurality of communication units to transmit control channel information to the communication resource allocator when the control channel is functioning as a voice channel, the method comprises the steps of:
    a) selecting at least one of the limited number of communication resources to receive voice data and at least a limited set of control data to produce a voice/control channel:
    b) transmitting the selection of the voice/control channel to the plurality of communication units;
    c) when the control channel is functioning as a voice channel, transmitting a control request of the at least a limited set of control data to the communication resource allocator by a communication unit via the voice/control channel and
    d) when the control channel is functioning as a voice channel, transmitting, by the communication resource allocator, a permission message to the plurality of communication units which indicates when the communication unit has allocated transmission time of a control request.

2. In a trunking communication system that comprises a plurality of communication units, a limited number of communication resources that are transceived via a predetermined number of repeaters, and a communication resource allocator that allocates the limited number of communication resources among the plurality of communication units, wherein one of the communication resources functions as a control channel and the remaining communication resources function as voice channels, and wherein, from time to time, the control channel is used as a voice channel, a method for a communication unit of the plurality of communication units to transmit control channel information to the communication resource allocator when the control channel is functioning as a voice channel, the method comprises the steps of:
    a) receiving information pertaining to a selection of at least one voice/control channel which includes a limited set of control data that the communication resource allocator will receive when the control channel is functioning as a voice channel;

b) storing the information pertaining to the selection of the at least one selected voice/control channel and the limited set of control data;

c) when the control channel is functioning as a voice channel, transmitting a control request of the limited set of control data to the communication resource allocator via the at least one voice/control channel; and d) when the control channel is no longer functioning as a voice channel, receiving information that the control channel is functioning as a control channel.

3. In a trunking communication system that comprises a plurality of communication units, a limited number of communication resources that are transceived via a predetermined number of repeaters, and a communication resource allocator that allocates the limited number of communication resources among the plurality of communication units, wherein one of the communication resources functions as a control channel and the remaining communication resources function as voice channels, and wherein, from time to time, the control channel is used as a voice channel, a method for a communication unit of the plurality of communication units to transmit control channel information to the communication resource allocator when the control channel is functioning as a voice channel, the method comprises the steps of:

a) receiving information pertaining to a selection of at least one voice/control channel which includes a limited set of control data that the communication resource allocator will receive when the control channel is functioning as a voice channel;

b) storing the information pertaining to the selection of the at least one selected voice/control channel and the limited set of control data;

c) when the control channel is functioning as a voice channel, transmitting a control request of the limited set of control data to the communication resource allocator via the at least one voice/control channel; and d) when the control channel is functioning as a voice channel, receiving from the communication resource allocator, a permission message which indicates when the communication unit has allocated transmission time of a control request.

* * * * *